Patented Feb. 16, 1932

1,844,983

UNITED STATES PATENT OFFICE

HERMANN SCHLADEBACH, OF DESSAU IN ANHALT, AND HERBERT HÄHLE, OF DESSAU-ZIEBIGK IN ANHALT, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

LACQUER FOR COATINGS ON METAL SURFACES

No Drawing. Application filed October 9, 1928, Serial No. 311,415, and in Germany November 12, 1927.

The present invention relates to new lacquers for protective coatings on metal surfaces.

Of the lacquers having a cellulose derivative as the basis, only nitrocellulose lacquers have been proposed for the production of a coating on metal surfaces for protection against corrosion; nitrocellulose lacquers, however, have the disadvantage that they are not sufficiently stable when stored for any length of time. Under normal conditions, all metals are associated with a small quantity of water absorbed on the surface and particularly in the pores of the metal; when the metal is coated with a linseed oil varnish, the capacity of the latter to swell enables the water to permeate the coating and escape into the atmosphere. The conditions are otherwise, however, in the case of a nitrocellulose lacquer, which yields on the metal a coating through which water cannot penetrate; moreover, owing to the rapid evaporation, during the production of the coating, of the volatile solvents contained in nitrocellulose lacquers, a further, not inconsiderable quantity of moisture, is caused to deposit on the metal surface. Contact of the metal, for example iron, with water enclosed by the coating is particularly disadvantageous on account of the fact that the water quickly becomes acid in reaction owing to partial decomposition of the nitrocellulose. For a similar reason, cellulose ester lacquers in general are unsuited to the production of protective layers on metal, since as is known, they undergo hydrolysis under the influence of ultra violet light, with the liberation of acid; for example, a nitrocellulose lacquer, gives rise to nitric acid, and an acetylcellulose lacquer to acetic acid, both of which acids have a corrosive action on many metals.

This invention is based on the discovery that cellulose ethers which are insoluble in water in combination with a heavy metal salt of an organic acid of high molecular weight are eminently suited to the production of protective coatings for preventing corrosion of metals. By coating the surface of the metal with a solution of such a cellulose ether in an organic solvent, a protective layer is produced which cannot give rise to acid by decomposition. For example, a solution of benzyl-cellulose in alcohol or benzene, to which may be added with advantage besides the heavy metal salts a suitable softening agent, yields when applied to iron a protective layer which prevents corrosion of the metal with certainty. Moreover, owing to the particularly favourable physical properties of the cellulose ethers, particularly benzyl-cellulose, the coating is strongly adherent to the metal, in contrast with coatings of nitrocellulose or acetylcellulose which can often be detached from an iron surface in coherent pieces.

We incorporate with the lacquer solution, a heavy metal salt of an acid of high molecular weight, such as a heavy metal salt of a fatty acid, a naphthenic acid, a resin acid or the like. Such salts are very readily soluble in the solvents for the cellulose ethers, and are uniformly distributed throughout the coating; on the other hand they are insoluble in water, and therefore assist in rendering the coating water proof. Suitable salts are, for example, copper naphthenate, copper oleate, lead naphthenate, ferric stearate, ferric laurates and ferric resinate. By selection of a metal salt, for example, a copper salt, which is destructive of lower animal and vegetable organisms, lacquer solutions may be made which are particularly useful for coating ships' bottoms and other metal surfaces which are exposed to such organisms.

Other substances may be incorporated in the solution of the cellulose ether in an organic solvent, for example, a coloring matter, a softening agent, or a filling agent. To the coating of the cellulose ether there may also be applied a further coating or coatings, for example, of a cellulose lacquer, a linseed oil varnish or wood-tar oil; the cellulose ether coating may also be produced by simultaneous use of the cellulose ether solution and an oil.

The following examples illustrate the invention, the parts being by weight:—

*Example 1.*—A coating preparation is made from—
- 10–15 parts of benzyl-cellulose.
- 50 parts of benzene.
- 50 parts of xylene.
- 10 parts of ethyl alcohol.
- 6–9 parts of tricresyl phosphate.
- 5 parts of copper naphthenate.

Instead of copper naphthenate, there may be used for example a naphthenate of lead, iron, nickel or cobalt.

*Example 2.*—A coating composition is made from—
- 15 parts of benzyl-cellulose.
- 50 parts of benzene.
- 50 parts of xylene.
- 10 parts of ethyl alcohol.
- 9 parts of tricresyl phosphate.
- 2 parts of ferric stearate.

Instead of ferric stearate, there may be used for example, ferric laurate, cupric laurate or ferric resinate.

What we claim is:—

1. A lacquer for coatings on metal surfaces comprising benzyl cellulose dissolved in a mixture of an aromatic hydrocarbon and an aliphatic alcohol, and a heavy metal compound of the group consisting of copper naphthenate, copper oleate, lead naphthenate, lead linoleate, ferric stearate, ferric laurate, ferric resinate.

2. A lacquer for coatings on metal surfaces comprising benzyl cellulose dissolved in a mixture of an aromatic hydrocarbon and an aliphatic alcohol, a heavy metal compound of the group consisting of copper naphthenate, cooper oleate, lead naphthenate, lead linoleate, ferric stearate, ferric laurate and ferric resinate, and tricresylphosphate.

3. A lacquer for coatings on metal surfaces comprising benzyl cellulose dissolved in a mixture of benzene, xylene and ethyl alcohol, copper naphthenate and tricresylphosphate.

In testimony whereof, we affix our signatures.

HERMANN SCHLADEBACH.
HERBERT HÄHLE.